Figure 1:
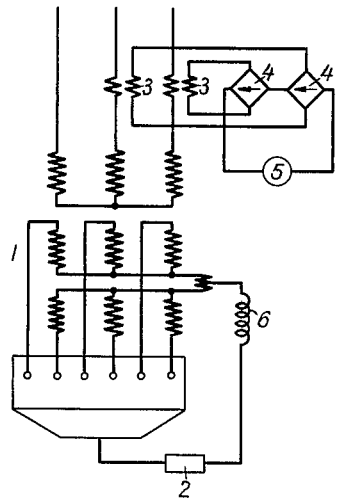

March 4, 1952     H. ÖFVERHOLM ET AL     2,588,155
RECTIFIER CONNECTION
Filed Sept. 10, 1947

Inventors.
Harry Forssell and
Håkan Öfverholm
By  *[signature]*
Attorney.

Patented Mar. 4, 1952

2,588,155

UNITED STATES PATENT OFFICE 2,588,155

RECTIFIER CONNECTION

Håkan Öfverholm, Vasteras, and Harry Forssell, Ludvika, Sweden, assignors to Allmänna Svenska Elektriska Aktiebolaget, Vasteras, Sweden, a Swedish corporation Application September 10, 1947, Serial No. 773,240
In Sweden July 11, 1941

Section 1, Public Law 690, August 8, 1946
Patent expires July 11, 1961

2 Claims. (Cl. 321—8)

In measuring electric currents, whether the result of the measuring is directly indicated on an instrument (measuring in a restricted sense) or influences an apparatus, as a relay or a regulator, rectifiers have, as known, been found very useful as intermediary means. Most instruments and apparatus based on the mutual action of currents and magnetic fluxes react more exactly for direct current than for alternating current, further the direct current can be more easily amplified by magnetic amplifiers (transductors), and finally, in comparing different currents, the result becomes independent of a possible phase displacement between the currents.

On the other hand, rectifiers, especially those of the comparatively simple types which can be economically employed for measuring purposes—in the above wide sense of the expression—have the inconvenience that the rectified current often becomes very uneven and notched. In some cases, this is of inferior importance, but in other ones, it may cause serious inconveniences for instance by equalizing currents. It is true that the current can always be smoothened by means of capacities and inductances in suitable combination, but such arrangements become rather complicated and may also cause non-desirable accessory effects.

The present invention relates to a rectifier connection for producing, in such cases where the alternating currents to be rectified are essentially independent of the total voltages in the circuits, rectified currents which are essentially free from notches depending on the rectification. Such currents which are essentially independent of the total voltages may be obtained for instance from current transformers connected with their primaries in the alternating current supply conductors of a rectifier which has means, such as a smoothening reactor, in the direct current line, determining the course of the direct current or from direct current magnetized inductances (transductors), in which, by suitable dimensioning, the traversing alternating current may be kept essentially proportional to the resultant magnetizing D. C. ampereturns, and the function of which thus will be essentially analogous to that of a current transformer. Both types of circuits are often used for measuring purposes in the aforesaid generic sense of the word.

According to the invention, rectifiers connected in series on the D. C. side are connected to at least two A. C. circuits of the aforesaid type having their currents considerably displaced in phase with respect to each other. Each such rectifier gives, when connected in an appropriate way, a current, which can be kept rather constant during the major portion of the A. C. cycle, but which shows more or less deep notches in the current curve during the commutation periods. By the series connection of these rectifiers on the D. C. side, these notches are filled out, as the current from the rectifier giving the highest value always predominates over the other or others. It is therefore only necessary to attend to a sufficient phase displacement between the different alternating currents to cause an appreciable notch in one current curve, for instance during a commutation period, always to be covered by a comparatively even portion of the current curve of another rectifier, in order that the resultant direct current shall be so uniform as permitted by the primarily governing current (the primary current of a current transformer, the resultant direct current of a transductor).

Figure 2:
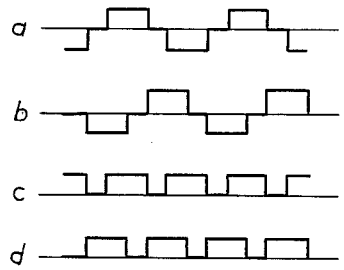
Figure 3:
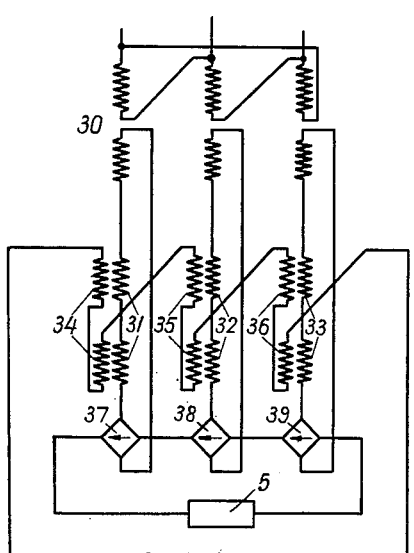
Figure 4:
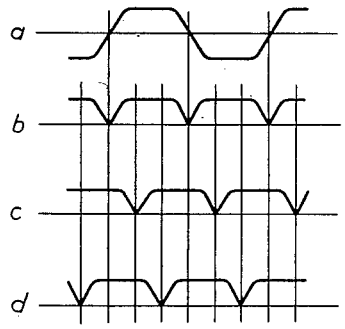

Two forms of the invention are diagrammatically illustrated in Figs. 1 and 3 of the accompanying drawing, while Fig. 2 shows a diagram of the manner of operation of Fig. 1 and Fig. 4 a diagram of the manner of operation of Fig. 3.

Fig. 1 shows an example of feeding the series-connected rectifiers from current transformers, connected in only two phase conductors of a rectifier 1, which is connected in the usual way with a three-phase feeding on the primary side and double three-phase connection with interphase transformer on the secondary side. The load of the rectifier is designated by 2, the current transformers for obtaining the alternating current by 3, and the rectifiers connected in series on the D. C. side by 4.

Assuming the smoothening reactor 6 to be large enough to keep the direct current delivered by the rectifier practically constant, the currents admitted by the individual anodes will also be practically constant during the period when each anode is burning, and which period extends through one-third cycle. A current practically proportional thereto will traverse the corresponding phase of the primary winding of the transformer 1, and the currents in conductors leading to two phases of the said primary winding will thus follow the curves $a$ and $b$ of Fig. 2, each being constant during one-third cycle, and its wave shape thus substantially independent of the wave shape of the voltages of the voltage source feeding the rectifier. The same current curves, possibly on another scale, appear on the secondary side of the current transformers 3, and they are rectified in the rectifiers 4 to form the current curves presented in Fig. 2c and d. If these currents are combined by the series-connection of the rectifiers in such way that the strongest current at each instant determines the current in the D. C. circuit, a comparison between Fig. 2c and 2d shows that this current becomes a quite uniform direct current which may be employed for influencing an instrument or an apparatus 5.

Fig. 3 shows the application of the invention on circuits fed through D. C. saturated inductances (transductors) which serve as amplifiers. The A. C. windings 31—36 of three such transductors are fed individually from the different phases of a three-phase alternating current source 30. The three D. C. windings 34—36 of the transductors are connected in series to a D. C. current source and are traversed by a current to be amplified. In series with each A. C. winding, there is connected a single-phase two-way rectifier 37—39, and these three rectifiers are connected in series on the D. C. side with their D. C. outputs in a closed circuit with a load 5 included therein.

Fig. 4a-d represents substantially the manner of operation of a connection according to Fig. 3. Each transductor admits a substantially trapezoidal A. C. wave (Fig. 4a), as at the beginning of the semicycle, the current rises nearly linearly during the time required for overcoming leakage reactances and the like, and then it is kept practically constant until the next commutation begins. The wave shape is thus, by means of the transductor, kept substantially independent of the wave shape of the voltages of the voltage source 30 feeding the device. By the corresponding rectifier, one of the trapezoidal half-waves is inverted, so that a pulsating direct current according to Fig. 4b is obtained. This direct current is constant during the major portion of the time, but twice during an entire cycle of the alternating current it has a notch reaching down to zero. Fig. 4c and d show the corresponding D. C. curves for the two other phases. If the three rectifiers 37—39 delivering such direct currents are connected in series on the D. C. side, the strongest one of the three currents will define the value at each instant, whence the result will be an entirely uniform direct current, provided that the direct current in the windings 31—33 is quite uniform. If, on the other hand, this direct current should be altered by some external influence, the direct current furnished by the three rectifiers follows this alteration practically instantaneously, as shown by a close examination.

The rectified current therefore will be an exact reproduction of the controlling direct current, but at the same time, it may represent a many times higher power than the latter. The arrangement is therefore suitable for, among others, measuring at a distance and regulation, both of which cases require a comparatively high power.

We claim as our invention:

1. Means for producing a direct current for measuring purposes, comprising a polyphase alternating current source, a polyphase load fed thereby, means for keeping the wave shape of the currents in the different phases of said load substantially independent of the wave shape of the voltages of said voltage source, single-phase full-wave rectifiers having alternating current inputs adapted to be fed individually by currents proportional to the currents of said alternating current phases and having direct current outputs, a closed circuit connecting said outputs in series, and current responsive means included in said closed circuit.

2. Means for producing a direct current for measuring purposes, comprising a polyphase alternating current source, polyphase conductors fed thereby, direct current saturable reactors and full-wave rectifiers having alternating current inputs connected in series with said reactors in at least two of said conductors, means for feeding direct current to said reactors, said rectifiers having direct current outputs connected in series in a closed circuit, and current responsive means included in said closed circuit.

HÅKAN ÖFVERHOLM.
HARRY FORSSELL.

REFERENCES CITED

The following references are of record in the file of this patent:

UNITED STATES PATENTS

| Number | Name | Date |
|---|---|---|
| 1,234,099 | Lendi | July 17, 1917 |
| 1,434,346 | Jonas | Oct. 31, 1922 |
| 1,479,561 | Stoekle | Jan. 1, 1924 |
| 1,822,618 | Gebhard | Sept. 8, 1931 |
| 1,980,395 | Fitzgerald | Nov. 13, 1934 |
| 2,027,311 | Fitzgerald | Jan. 7, 1936 |
| 2,040,492 | Logan | May 12, 1936 |
| 2,153,195 | Lilja | Apr. 4, 1939 |
| 2,289,090 | Bedford | July 7, 1942 |
| 2,299,094 | Klemperer | Oct. 20, 1942 |
| 2,334,045 | Temple et al. | Nov. 9, 1943 |
| 2,403,891 | Lamm | July 9, 1946 |